(12) United States Patent
Viebke et al.

(10) Patent No.: US 11,001,340 B2
(45) Date of Patent: *May 11, 2021

(54) MOTOR VEHICLE WITH SNOWGLIDING DEVICE

(71) Applicant: Serneke Hybrid Ski AB, Västra Frölunda (SE)

(72) Inventors: Gert Viebke, Västra Frölunda (SE); Ola Serneke, Gothenburg (SE)

(73) Assignee: Serneke Hybrid Ski AB, Västra Frölunda (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/650,165

(22) PCT Filed: Sep. 25, 2018

(86) PCT No.: PCT/EP2018/075946
§ 371 (c)(1),
(2) Date: Mar. 24, 2020

(87) PCT Pub. No.: WO2019/057985
PCT Pub. Date: Mar. 28, 2019

(65) Prior Publication Data
US 2020/0239107 A1    Jul. 30, 2020

(30) Foreign Application Priority Data
Sep. 25, 2017   (SE) .................................... 1751188-2

(51) Int. Cl.
*B62M 27/02* (2006.01)
*B60L 50/60* (2019.01)
(Continued)

(52) U.S. Cl.
CPC ............. *B62M 27/02* (2013.01); *B60L 8/003* (2013.01); *B60L 50/60* (2019.02); *H01C 1/1406* (2013.01);
(Continued)

(58) Field of Classification Search
CPC ..... A63C 2203/12; A63C 5/056; B60L 50/60; B60L 8/003; B62M 27/02;
(Continued)

(56) References Cited

U.S. PATENT DOCUMENTS 3,774,923 A * 11/1973 Suroff ...................... A63C 5/06
280/601
5,441,305 A    8/1995 Tabar
(Continued)

OTHER PUBLICATIONS

International Search Report and Written Opinion for International Application No. PCT/EP2018/075946, dated Jan. 31, 2019 (13 pages).

*Primary Examiner* — Ruth Ilan
*Assistant Examiner* — Felicia L. Brittman
(74) *Attorney, Agent, or Firm* — Kagan Binder, PLLC

(57) ABSTRACT

A snow gliding device (1) comprising: a first gliding surface (10), a first layer (20) for heating said first gliding surface (1), where the first layer (20) comprises: a positive temperature coefficient superimposed impedance polymeric compound (22), a first and a second electrode (24, 26), wherein said positive temperature coefficient superimposed impedance polymeric compound (22) is at least partially sandwiched between said first and second electrode (24, 26), and which first and second electrodes (24, 26) are adapted to provide a potential difference across said positive temperature coefficient superimposed impedance polymeric compound (22) when connected to a power source, wherein the first layer (20) is arranged adjacent to and in thermal communication with said first gliding surface (10).

16 Claims, 5 Drawing Sheets

(51) Int. Cl.
  *B60L 8/00* (2006.01)
  *H01C 1/14* (2006.01)
  *H01C 7/02* (2006.01)
  *H05B 3/14* (2006.01)
  *A63C 5/056* (2006.01)

(52) U.S. Cl.
  CPC ............... *H01C 7/028* (2013.01); *H05B 3/14* (2013.01); *A63C 5/056* (2013.01); *A63C 2203/12* (2013.01); *B62M 2027/025* (2013.01)

(58) Field of Classification Search
  CPC .... B62M 2027/025; H05B 3/14; H01C 7/028; H01C 1/1406
  USPC .......................................................... 180/186
  See application file for complete search history.

(56) References Cited

U.S. PATENT DOCUMENTS

| | | |
|---|---|---|
| 8,367,986 B2 | 2/2013 | Von Wachenfeldt et al. |
| 2011/0012319 A1* | 1/2011 | Kuczynski .......... H01L 31/0508 280/11.115 |

* cited by examiner

MOTOR VEHICLE WITH SNOWGLIDING DEVICE

CROSS-REFERENCE TO RELATED APPLICATIONS

This application claims priority to International Application No. PCT/EP2018/075946, filed Sep. 25, 2018 and titled "MOTOR VEHICLE WITH SNOWGLIDING DEVICE," which in turn claims priority from a European Patent Application having serial number 1751188-2, filed Sep. 25, 2017, titled "MOTOR VEHICLE WITH SNOWGLIDING DEVICE," both of which are incorporated herein by reference in their entireties.

TECHNICAL FIELD OF THE INVENTION

The present invention relates to a motor vehicle comprising a snow gliding device. Moreover, it relates to a system comprising a motor vehicle comprising a snow gliding device and a method for operating the motor vehicle comprising the snow gliding device.

BACKGROUND OF THE INVENTION

Snow gliding devices of various kinds, such as skis, snowboards and/or sledges, are used to travel or play on snow, ice or artificial snow. Further these kind of snow gliding devices may be a part of a motor vehicle used for transport on snow. When such a snow gliding device is moving on the snow, friction between the snow gliding device and the snow will cause energy losses. Hence, the user of the snow gliding device need to provide more energy than what would be needed if the friction between the snow gliding device and the snow was reduced.

The friction can be reduced in many ways. For skis, especially cross-country skis, the reduction of friction is mainly done by the use of ski wax. Most often, the ski wax has to be applied to the ski each time the ski will be used. The ski wax will be torn away by the friction between the ski and the snow during the use of the ski and therefore there will often be a need for applying the wax several time during for example a race. During use of ski wax for indoor skiing on artificial snow, there will be an accumulation of ski wax in the snow which makes it necessary to regularly replace it with cleaner snow. There is also a need for different ski waxes depending on the weather conditions. Moreover, ski waxes often comprise flourocarbons which makes them harmful both for humans and the environment. Humans are exposed to them e.g. when waxing the skis, and particles from torn off wax is left on the ground and may migrate into the ground water. An example of a ski wax with a height content of flourocarbons is high velocity cera. Hence, there is a demand for alternative methods for decreasing the friction. Alternative ways of reducing the friction is e.g. the choice of material and/or increasing the smoothness of the material of the snow gliding device contacting the snow.

SUMMARY OF THE INVENTION

It is an object of the present invention to improve the current state of the art, and to at least alleviate the above mentioned problems. This and other objects are achieved by a snow gliding device, a system comprising a snow gliding device and a method for operating a snow gliding device.

According to a first aspect of the invention a motor vehicle comprising a snow gliding device is provided. The snow gliding device comprises:
  a first gliding surface
  a first layer for heating said first gliding surface, which first layer comprises:
    a positive temperature coefficient superimposed impedance polymeric compound
    a first and a second electrode, wherein said positive temperature coefficient superimposed impedance polymeric compound is at least partially sandwiched between said first and second electrode, and which first and second electrodes are adapted to provide a potential difference across said positive temperature coefficient superimposed impedance polymeric compound when connected to a power source,
  which first layer is arranged adjacent to and in thermal communication with said first gliding surface.

It should be understood that "when connected" means that the power source provides a potential to the first electrode, which is different from a potential applied to the second electrode, thereby providing a potential difference across the positive temperature coefficient superimposed impedance polymeric compound. According to at least one example embodiment of the invention, the power source must be turned on in order to be connected to the first and second electrode.

Moreover, it should be understood that "thermal communication" means that heat can be transferred from said first layer to said first gliding surface. The heat can be transferred e.g. by means of conduction or radiation.

Further, it should be understood that a motor vehicle comprising a snow gliding device may be any vehicle using motor power to move and wherein at least one interface between the ground and the motor vehicle comprises said snow gliding device. The motor vehicle may be used or arranged for traveling on e.g. snow, ice or artificial snow.

The subject matter of claim 1 is advantageous, as it enables a lowering of the energy needed for driving or traveling with the vehicle as the friction against the ground surface is lowered. In other words, the power or fuel consumption of the vehicle may be lowered.

According to at least one example embodiment of the invention the positive temperature coefficient superimposed impedance polymeric compound covers 10% to 100% of the gliding surface, or it can cover 25 to 75% of the gliding surface, or it can cover 40% to 60% of the gliding surface. In other words, the positive temperature coefficient superimposed impedance polymeric compound covers at least 10% of the gliding surface, or it covers at least 25% of the gliding surface, or it covers 40% of the gliding surface.

According to at least one example embodiment of the invention the gliding surface is at least partially configured to frictionally contacting e.g. snow, ice and/or artificial snow.

According to at least one example embodiment of the invention the first gliding surface can be provided with ski wax. When the first gliding surface is provided with ski wax, the first gliding surface is at least partially not in physical contact with e.g. snow, ice and/or artificial snow.

According to at least one example embodiment of the invention the invention is suitable for use in an environment where the temperature of the snow, ice and/or artificial snow varies only within a limited range, e.g. the temperature of the snow, ice and/or artificial snow only varies within a temperature range of 10 degrees, or more preferably within a temperature range of 5 degrees, or more preferably within a temperature range of 3 degrees. Examples of such environments are ski tunnels, indoor ice rinks and/or short outdoor tracks or short time out-door skiing or short time down-hill skiing, or skiing at a day and a place where the temperature only varies within said rages.

According to at least one example embodiment of the invention, the motor vehicle is a snowmobile. The "snowmobile" may be a snow machine or a power sledge.

According to at least one example embodiment of the invention the first gliding surface and the positive temperature coefficient superimposed impedance polymeric compound may be the same, i.e. the first gliding surface made be made out of the positive temperature coefficient superimposed impedance polymeric compound.

According to at least one example embodiment of the invention the positive temperature coefficient superimposed impedance polymeric compound can be provided on top of the first gliding surface, as oriented when the device is in use. In other words, the positive temperature coefficient superimposed impedance polymeric compound is not embedded within the first gliding surface.

According to at least one example embodiment of the invention the positive temperature coefficient superimposed impedance polymeric compound is a siloxane polymer compound comprising conducting particles.

According to at least one example embodiment of the invention the material may be the same material as presented in US 8367986 B2. Please refer to that document for further details of the positive temperature coefficient superimposed impedance polymeric compound.

According to at least one example embodiment of the invention the siloxane polymer compound comprising conducting particles may provide a light-weight and flexible snow gliding device.

According to at least one example embodiment the conducting particles may be carbon nanoparticles. The amount of carbon nanoparticles may affect the temperature interval in which the snow gliding device operate.

According to at least one example embodiment of the invention the snow gliding device further comprises a bottom layer which comprises two major opposite surfaces wherein said first gliding surface is one of said major opposite surfaces and wherein said first layer is arranged in physical contact with the other of said opposite surfaces.

According to at least one example embodiment of the invention the bottom layer is made from a polymer material, wherein said polymer material is thermoplastic and/or a thermoset. The polymer material may for example be polyethylene.

According to at least one example embodiment of the invention the first layer may be attached to the other of said opposite surfaces by an adhesive e.g. glue. Moreover, the first layer may be attached to the bottom layer via mechanical means e.g. clamps.

According to at least one example embodiment of the invention the snow gliding device further comprises a bottom layer which comprises two major opposite surfaces, wherein said first gliding surface is one of said major opposite surfaces and wherein said first layer is embedded in said bottom layer.

According to at least one example embodiment of the invention, having the first layer embedded in said bottom layer may provide a thinner snow gliding device. According to at least one example embodiment of the invention, having the first layer embedded in the bottom layer minimize the risk for delamination.

According to at least one example embodiment of the invention the snow gliding device further comprises a control circuitry for adjusting the potential difference provided to said positive temperature coefficient superimposed impedance polymeric compound in correspondence with predetermined value.

According to at least one example embodiment of the invention, the predetermined value may directly correspond to a potential difference. Moreover, the predetermined value may correspond to the temperature of e.g. snow, ice or artificial snow. When the temperature increases and/or decreases a new predetermined value is provided to the control circuitry and the potential difference provided to the positive temperature coefficient superimposed impedance polymeric compound is adjusted in correspondence with predetermined value. The predetermined value may be directly proportional to the temperature of e.g. snow, ice or artificial snow, or it could have configured in various other was. A control circuitry may be used in order to calculate the potential difference which shall be provided to the positive temperature coefficient superimposed impedance polymeric compound based on the predetermined value and or temperature information.

According to at least one example embodiment of the invention the snow gliding device further comprises a temperature sensor which provides said control circuitry with a signal comprising said predetermined value.

According to at least one example embodiment of the invention the temperature sensor may be located on the snow gliding device. Alternatively the temperature sensor can be placed externally from the snow gliding device. For example the temperature sensor may be placed on the user of the snow gliding device, and/or one or more sensors may be arranged in the snow or ice e.g. along a path. Additionally, or alternatively, the temperature sensor may be placed on the motor vehicle. Sensors arranged in the snow may communicate wirelessly with the snow gliding device. According to at least one embodiment of the invention the snow gliding device is used on artificial snow and the temperature sensor may then be connected to the cooling element of said artificial snow.

According to at least one example embodiment of the invention the temperature sensor measures the temperature of e.g. snow, ice or artificial snow. Optionally, the temperature sensor uses the temperature measurement to calculate a temperature difference. Additionally or alternatively, the temperature sensor measure the temperature difference relative a reference temperature. The reference temperature may be set at e.g. the start of a race or it could be any temperature decided by the user of the snow gliding device. Subsequently, after measuring the temperature and/or the temperature difference, the temperature sensor provides the control circuit with a signal that corresponds to a predetermined value, as discussed above.

According to at least one example embodiment of the invention the control circuitry further comprises an interface for manually or wirelessly entering the predetermined value.

According to at least one example embodiment of the invention the predetermined value can be manually provided by the user of the motor vehicle comprising the snow gliding device or it can be manually provided by another person at for example the start of a race. The other person can be entering predetermined values to several users, such as a team.

According to at least one example the predetermined value may be provided wirelessly to the interface of the control circuitry. The predetermined value may be provided by the user of the snow gliding device via for example a smart phone or a smart watch or the like. Additionally, or alternatively, the predetermined value may be provided by the user via a control panel on the motor vehicle. According to at least one example embodiment of the invention the predetermined value can be provided to the interface of the control circuitry by another person. This person may provide predetermined values for several users, such as a team. According to at least one example embodiment of the invention there may be an external device communicating with the control circuitry via wireless signals or via wired communication. Such an external device may have access to real time information about the weather conditions, or at least frequent updates of the information regarding weather conditions. This information can be used to regulate the potential difference as described herein. Examples of such external devices may be a smart phone or smart watch or a temperature measuring device communicating via e.g. Bluetooth or any other sender updated with weather information.

According to at least one example embodiment of the invention the snow gliding device is comprises at least one ski.

According to at least one example embodiment of the invention, the snow gliding device comprises at least two skis, wherein said at least two skis is arranged at a front part of said vehicle.

It should be understood that the snow gliding device is not limited to the examples given above, it could also be for example a sled or a sleigh or any other snow gliding device provided with a first gliding surface used for e.g. racing, exercising or playing.

According to a second aspect of the invention a system is provided.

The system comprises
 a snow gliding device according to any of claim 1-8
 a power source
 means for connecting said power source to said first and second electrodes.

Effects and features of this second aspect of the present invention are largely analogous to those described above in connection with the first aspect of the inventive concept. Embodiments mentioned in relation to the first aspect of the present invention are largely compatible with the second aspect of the invention.

According to at least one example embodiment of the invention the means for connecting the power source to the first and second electrodes may comprise cords or wires. Moreover, the cords or wires may be extendable in order to connect a power source which can be located a different places. According to at least one example embodiment of the invention the means for connecting the power source to the first and second electrode may be made out of materials for providing a light-weight product.

According to at least one example embodiment of the invention the power source is a battery and/or a solar cell panel, which battery and/or solar cell panel is optionally carried by the clothes worn by the user of said snow gliding device or which battery and/or solar cell panel is optionally arranged on the motor vehicle.

According to at least one example embodiment of the invention the battery pack may comprise one or several batteries. The batteries may be rechargeable. According to at least one embodiment of the invention the battery pack may be located at the wrist of the user and/or it can be arranged in a pocket attached to the clothes worn by the user of the snow gliding device.

According to at least one example embodiment of the invention the power source may be a solar cell panel, which solar cell panel may comprise one or several solar cells, which may be flexible. The solar cell may be various types of solar cells, for example they may be silicon based solar cell, where the active layer may be made from crystalline silicon. The active layer of the silicon based solar cell may also be made from amorphous silicon. Moreover, the solar cells may be solar cells where the active layer comprises other materials than silicon, such as various thin film solar cells, e.g. dye sensitized solar cell or organic solar cells. According to at least one example embodiment the solar cell panel may be located on the snow gliding device and/or it can be arranged on the cloth worn by the user of the snow gliding device.

According to a third aspect of the invention a method for operating the snow gliding device is provided. The method for operating the snow gliding device comprises the following steps:
 providing a snow gliding device according to claim 1;
 providing a first predetermined value,
 applying a first potential difference to said positive temperature coefficient superimposed impedance polymeric compound based on said first predetermined value.

Effects and features of this third aspect of the present invention are largely analogous to those described above in connection with the first and/or the second aspects of the inventive concept. Embodiments mentioned in relation to the first and/or the second aspects of the present invention are largely compatible with the third aspect of the invention.

According to at least one alternative example embodiment of the invention, the method further comprises the step of:
 receiving a first entered value at an interface of a control circuit of the snow gliding device, which first value is wirelessly and/or manually entered into said interface and wherein said first predetermined value is set based on said first entered value.

According to at least one example embodiment of the invention, the step of providing a first predetermined value further comprises:
 identifying the ambient temperature by means of a temperature sensor as explained above.

According to at least one example embodiment of the invention, the step of providing a first predetermined value further comprises:
 converting said sensor reading to a first predetermined value; and/or
 manually setting said first predetermined value via an interface as explained above; and/or
 wirelessly providing a control circuitry with a signal comprising a value of said first predetermined value via said interface; wherein said first predetermined value corresponds to heating of said first surface to a temperature within the range of ±5° C. as compared with the ambient temperature. According to at least on alternative embodiment of the invention said predetermined value is based on both the first entered value and an output from said temperature sensor.

According to at least one example embodiment of the invention the ambient temperature is measured by a sensor. The sensor provides a control circuitry with a first value representing the measured temperature. The control circuitry is also provided with a second value representing the temperature to which the first surface is to be heated accordingly. The second value is chosen such that the friction is reduced in order to optimize the gliding properties of the snow gliding device. Additionally, or alternatively, the control circuitry is provided with a algorithm for computing the second value based on said first value. e.g. the second temperature is 4° C. higher compared to the first temperature. However, the temperature difference need not be constant. Additionally or alternatively, a look up table may be provided for converting said first value into the second value; the difference between said first and second temperature values need not be constant but can have any appropriate dependence. The measurements from the sensor may be provided to the control circuitry at predetermined time intervals, e.g. 1 time/min, 1 time/5 min, 1 time/15 min, 1 time/30 min, 1 time/hour.

Additionally or alternatively, the first and/or second temperature is manually provided to the control circuitry (by wire or wirelessly); which lets the user take control of the resulting temperature of the first surface.

Additionally or alternatively, the user manually instructs the control circuitry that the temperature of the first surface is to be raised or lowered—without entering any specific temperature; by use of e.g. a "+" and "−" button.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF THE DRAWINGS

In the present detailed description, embodiments of the present invention will be discussed with the accompanying figures. It should be noted that this by no means limits the scope of the invention, which is also applicable in other circumstances for instance with other types or variants of snow gliding devices than the embodiments shown in the appended drawings. Further, that specific features are mentioned in connection to an embodiment of the invention does not mean that those components cannot be used to an advantage together with other embodiments of the invention.

In essence, a snow gliding device, e.g. a ski, a snowboard or a sledge is provided. The snow gliding device has a first layer which heats a first gliding surface in order to decreasing the friction between the snow, ice and/or artificial snow and the snow gliding device.

Figure 1:
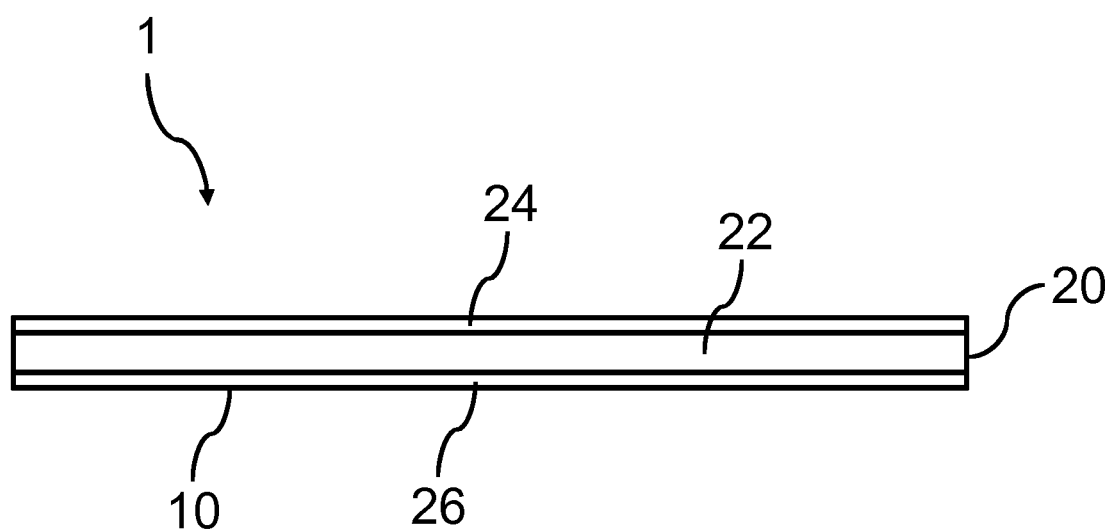
FIG. 1 is a cross-sectional view of a snow gliding device in accordance with at least one embodiment of the invention.

FIG. 1 shows a cross-sectional view of a snow gliding device 1. A vertical cross-section is taken along the transport direction of the snow gliding device 1. Moreover, the order and the configuration of the layers is the same also when a vertical cross-section is taken in a direction transverse to the transport direction of the snow gliding device 1. The snow gliding device 1 comprises a first gliding surface 10 and a first layer 20. The first layer 20 comprises a positive temperature coefficient superimposed impedance polymeric compound 22 and a first 24 and a second electrode 26. The positive temperature coefficient superimposed impedance polymeric compound 22 is a siloxane polymer compound comprising conducting particles.

The first layer 20 comprises two major opposite surfaces wherein said first gliding surface 10 is arranged adjacent to and in thermal communication with said first layer 20 at one of said major opposite surfaces. The first layer 20 comprises the positive temperature coefficient superimposed impedance polymeric compound 22 which is sandwiched between said first 24 and second electrode 26.

The function of the first layer 20 is to heat the first gliding surface 20. The first 24 and second electrodes 26 are adapted to provide a potential difference across the positive temperature coefficient superimposed impedance polymeric compound 22 when connected to a power source.

Figure 2A:
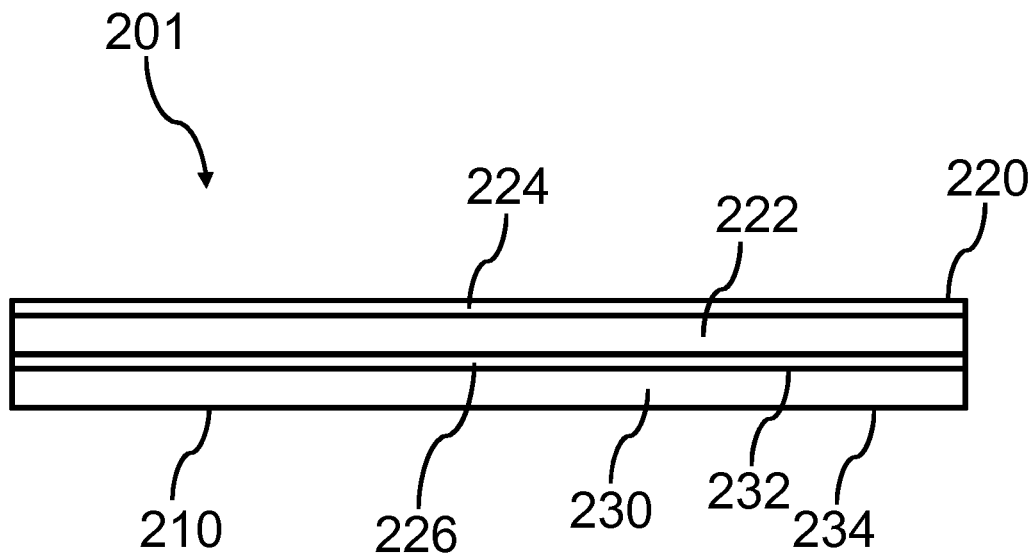
FIG. 2a is a cross-sectional view of a snow gliding device in accordance with at least one embodiment of the invention.
Figure 2B:
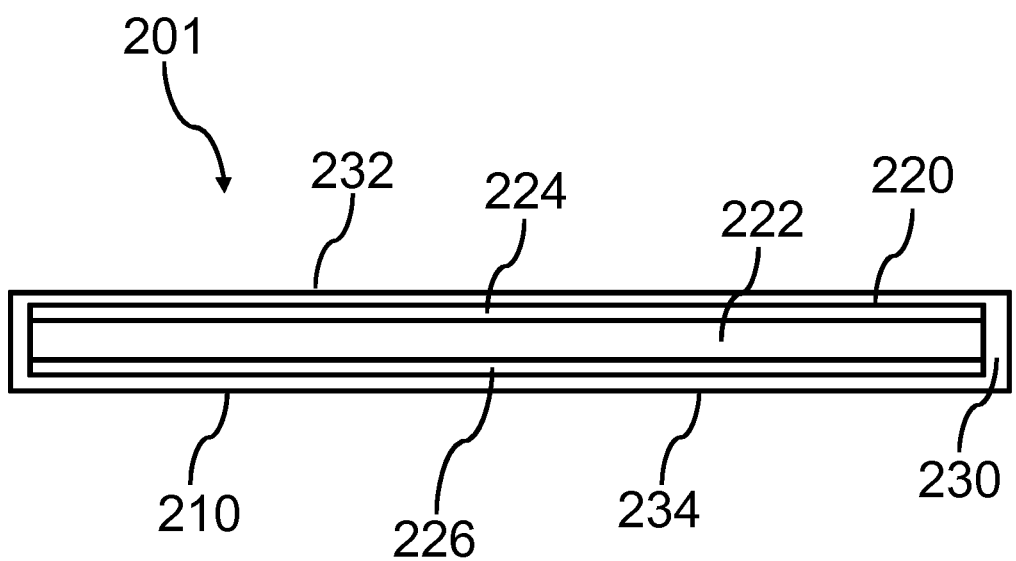
FIG. 2b is a cross-sectional view of a snow gliding device in accordance with at least one embodiment of the invention.

FIGS. 2a and 2b shows a cross-sectional view of a snow gliding device 201. A vertical cross-section is taken along the transport direction of the snow gliding device 201. Moreover, the order and the configuration of the layers is the same also when a vertical cross-section is taken in a direction transverse to the transport direction of the snow gliding device 201. The snow gliding device 201 comprises a first gliding surface 210 and a first layer 220. The first layer 210 comprises a positive temperature coefficient superimposed impedance polymeric compound 222 and a first 224 and a second electrode 226. Further, the snow gliding device comprises a bottom layer 230, which bottom layer 230 comprises two major opposite surfaces 232 and 234.

As the snow gliding device 201 of FIGS. 2a and 2b is arranged in the same way as the snow gliding device described above, except that in the embodiment shown in FIG. 2a the first gliding surface 210 is the same as the major opposite surface 234. Moreover, the first layer 220 is arranged in physical contact with the opposite surfaces 232.

In the embodiment shown in FIG. 2b the first gliding surface is the same as the major opposite surface 234. Moreover, the first layer 220 is embedded in the bottom layer 230.

Figure 3:
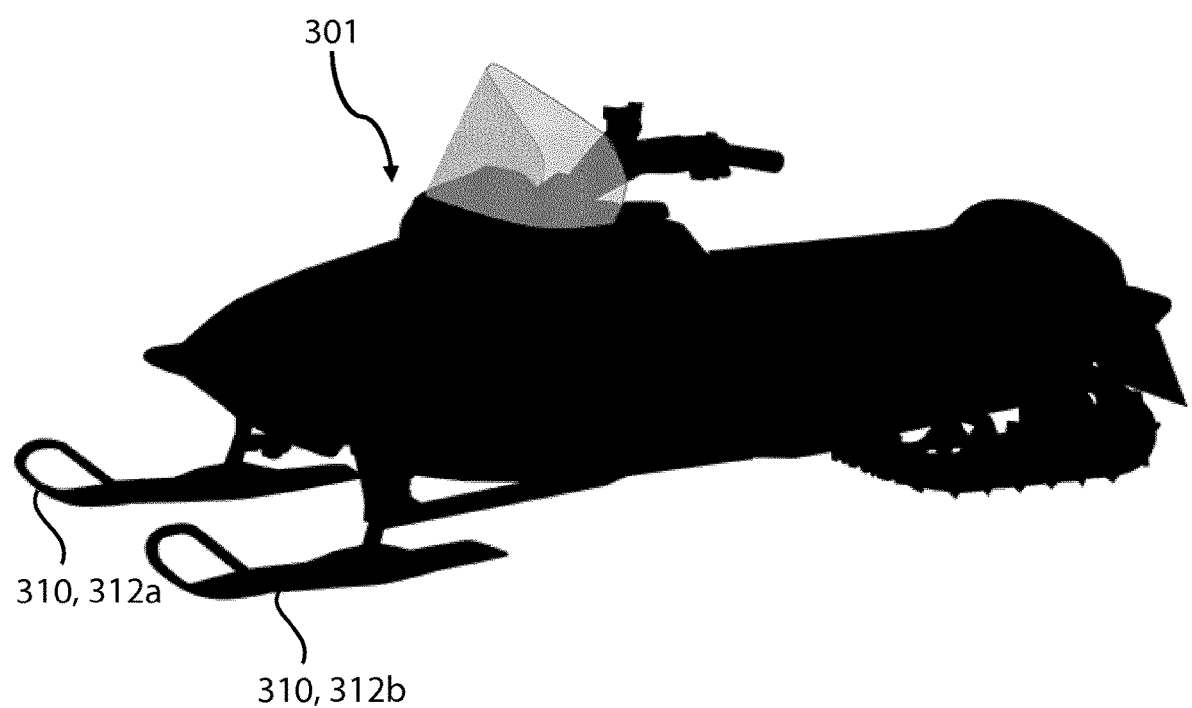
FIG. 3 shows a motor vehicle in accordance with at least one example embodiment of the invention.

FIG. 3 shows a motor vehicle 301. In FIG. 3, the motor vehicle 201 is a snowmobile. The motor vehicle 301 comprises a snow gliding device 310, which comprises two skis 312a,b.

Figure 4:
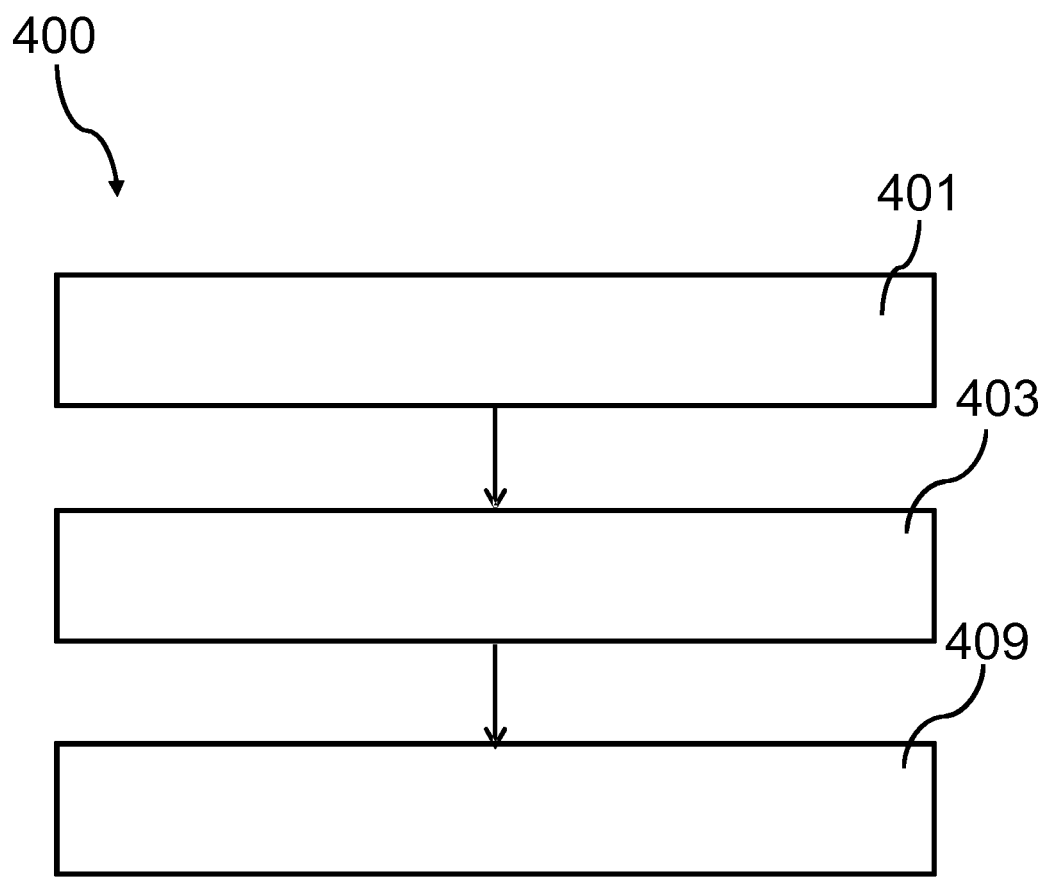
FIG. 4 is a schematic view of a method of operating a snow gliding device in accordance with at least one embodiment of the invention.

FIG. 4 shows a schematic view of a method 400 for operating the snow gliding device. The method 400 for operating the snow gliding device comprises the steps: providing 401 a snow gliding device, providing 403a first predetermined value, applying 409 a first potential difference to the positive temperature coefficient superimposed impedance polymeric compound based on the first predetermined value.

According to an example embodiment of the invention the method 400 for operating the snow gliding device starts with the step of providing 401 a snow gliding device. The next step is providing 403 a predetermined value. The last step is applying 409 a first potential difference to the positive temperature coefficient superimposed impedance polymeric compound based on the first predetermined value.

Figure 5:
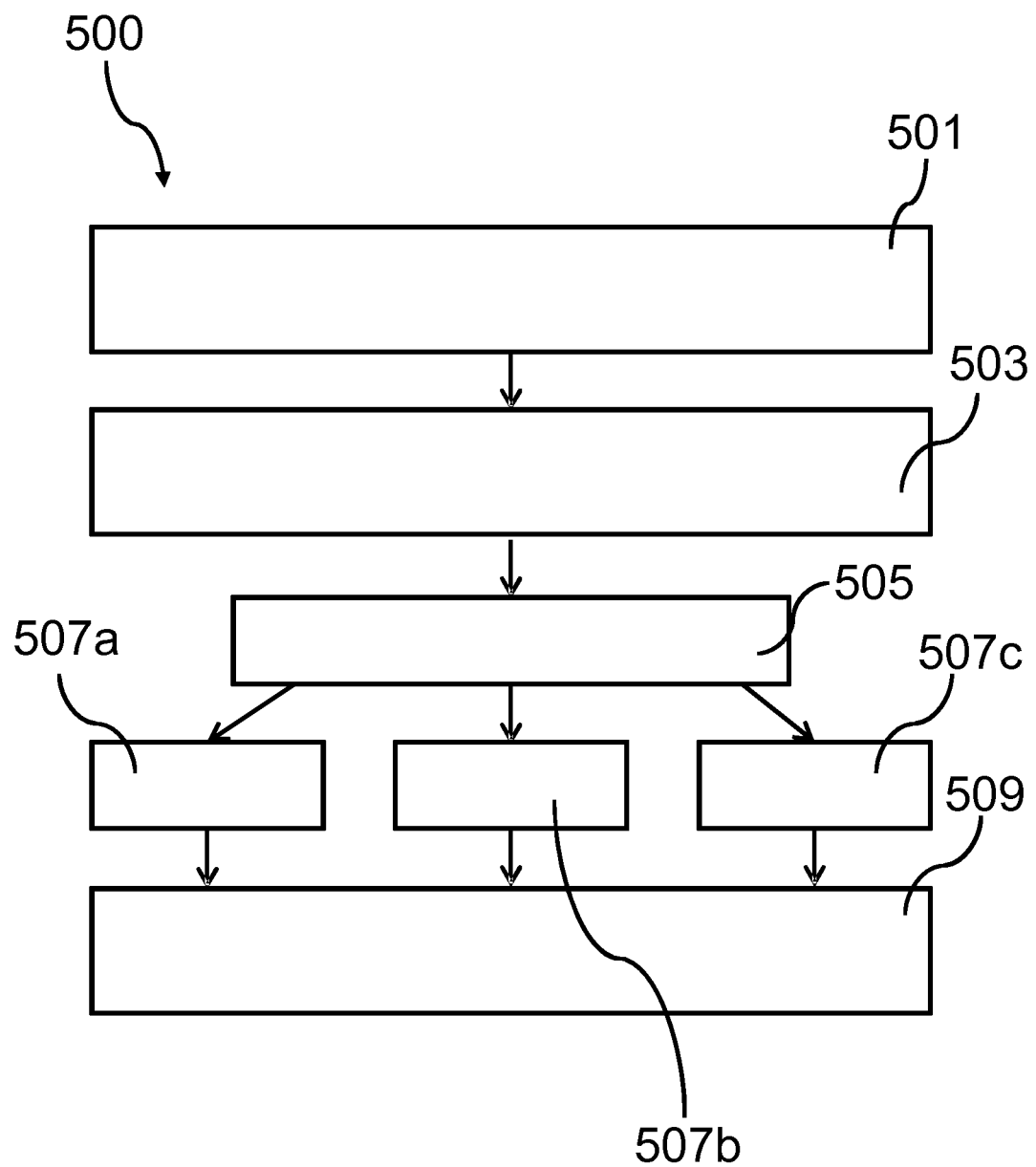
FIG. 5 is a schematic view of a method of operating a snow gliding device in accordance with at least one embodiment of the invention.

FIG. 5 shows a schematic view of a method 500 for operating the snow gliding device. The method 500 for operating the snow gliding device comprises the steps: providing 501 a snow gliding device, providing 503 a first predetermined value, applying 509 a first potential difference to said positive temperature coefficient superimposed impedance polymeric compound based on said first predetermined value. The step of providing 503 a first predetermined value further comprises: identifying 505 the ambient temperature by means of a sensor. Moreover, the step of providing 503 a first predetermined value further comprises: converting 507a said sensor reading to a first predetermined value, and/or manually setting 507b said first predetermined value via an interface, and/or wirelessly providing 507c a control circuitry with a signal comprising a value of said first predetermined value via said interface. The predetermined value corresponds to heating of said first surface by 1-10° C., or by more than 1°, 2°, 3°, 4°, 5°, 6°, 7°, 9° C. and/or by no more than 4°, 5°, 7°, 9° C. as compared with the ambient temperature.

According to an example embodiment of the invention the method 500 for operating the snow gliding device starts with the step of providing 501 a snow gliding device. The next step is providing 503 a predetermined value. The last step is applying 509 a first potential difference to the positive temperature coefficient superimposed impedance polymeric compound based on the first predetermined value. The step of providing 503 a predetermined value starts with identifying 505 the ambient temperature by means of a sensor and subsequently any of following steps can be chosen: converting 507a said sensor reading to a first predetermined value, and/or manually setting 507b said first predetermined value via an interface, and/or wirelessly providing 507c a control circuitry with a signal comprising a value of said first predetermined value via said interface. The predetermined value corresponds to heating of said first surface by 1-10° C., or by more than 1°, 2°, 3°, 4°, 5°, 7°, 9° C. and/or by no more than 4°, 5°, 7°, 9° C. as compared with the ambient temperature.

Specific embodiments of the invention have now been described. However, several alternatives are possible, as would be apparent for someone skilled in the art. The skilled person realizes that a number of modifications of the embodiments described herein are possible without departing from the scope of the invention, which is defined in the appended claims.

For example, other snow gliding devices than a ski, a snowboard and/or a sledge can be equipped with the first layer as described here in. Moreover, the snow gliding device may comprise more layers than the first layer and the bottom layer. In addition, the first gliding surface or the first gliding surfaces may be arrange on the snow gliding device in various ways.

The invention claimed is:

1. A motor vehicle comprising a snow gliding device, wherein said snow gliding device comprises:
   a first gliding surface
   a first layer for heating said first gliding surface, which first layer comprises:
   a positive temperature coefficient superimposed impedance polymeric compound
   a first and a second electrode, wherein said positive temperature coefficient superimposed impedance polymeric compound is at least partially sandwiched between said first and second electrode, and which first and second electrodes are adapted to provide a potential difference across said positive temperature coefficient superimposed impedance polymeric compound when connected to a power source, which first layer is arranged adjacent to and in thermal communication with said first gliding surface.

2. A motor vehicle according to claim 1, wherein said motor vehicle is a snowmobile.

3. A motor vehicle according to claim 1, wherein said positive temperature coefficient superimposed impedance polymeric compound is a siloxane polymer compound comprising conducting particles.

4. A motor vehicle according to claim 1, further comprising a bottom layer which comprises two major opposite surfaces wherein said first gliding surface is one of said major opposite surfaces and wherein said first layer is arranged in physical contact with the other of said opposite surfaces.

5. A motor vehicle according to claim 1, further comprising a bottom layer which comprises two major opposite surfaces, wherein said first gliding surface is one of said major opposite surfaces and wherein said first layer is embedded in said bottom layer.

6. A motor vehicle according to claim 1, further comprising a control circuitry for adjusting the potential difference provided to said positive temperature coefficient superimposed impedance polymeric compound in correspondence with a predetermined value.

7. A motor vehicle according to claim 6, further comprising a temperature sensor which provides said control circuitry with a signal comprising said predetermined value.

8. A motor vehicle according to claim 6, wherein said control circuitry further comprises an interface for manually or wirelessly entering the predetermined value.

9. A motor vehicle according to claim 1, wherein said snow gliding device comprises at least one ski.

10. A motor vehicle according to claim 9, wherein said snow gliding device comprises at least two skis, wherein said at least two skis is arranged at a front part of said motor vehicle.

11. A system comprising
    a motor vehicle comprising a snow gliding device according to claim 1;
    a power source; and
    means for connecting said power source to said first and second electrodes.

12. A system according to claim 11 wherein said power source is a battery and/or a solar cell panel, which battery and/or solar cell panel is carried by clothing.

13. A system according to claim 11 wherein said power source is a battery and/or a solar cell panel, which battery and/or solar cell panel is arranged on said motor vehicle.

14. A method for operating a motor vehicle comprising a snow gliding device, wherein said method comprises the following steps:
    providing a motor vehicle comprising the snow gliding device according to claim 1;
    providing a first predetermined value,
    applying a first potential difference to said positive temperature coefficient superimposed impedance polymeric compound based on said first predetermined value.

15. The method for operating a motor vehicle according to claim 14, wherein said step of providing the first predetermined value further comprises:
    providing a control circuitry for adjusting the potential difference provided to said positive temperature coefficient superimposed impedance polymeric compound in correspondence with predetermined value, and
    identifying the ambient temperature by means of a temperature sensor which provides said control circuitry with a signal comprising said predetermined value.

16. The method for operating a motor vehicle according to claim 14, wherein said step of providing the first predetermined value further comprises:

converting said sensor reading to a first predetermined value; and/or
 manually setting said first predetermined value via an interface for manually or wirelessly entering the predetermined value; and/or
 wirelessly providing a control circuitry with a signal comprising a value of said first predetermined value via said interface; wherein said first predetermined value corresponds to heating of said first surface to a temperature within the range of ±5° C. as compared with the ambient temperature.

\* \* \* \* \*